DIGITAL MODULATION AND DEMODULATION IN A COMMUNICATION SYSTEM

INVENTORS
RONALD E. HILEMAN
VINCENT C. OXLEY
JOSEPH W. SCHMITT
BY
Spencer E. Olson
ATTORNEY

*INVENTORS*
RONALD E. HILEMAN
VINCENT C. OXLEY
JOSEPH W. SCHMITT

*BY* Spencer E. Olson

*ATTORNEY*

INVENTORS
RONALD E. HILEMAN
VINCENT C. OXLEY
JOSEPH W. SCHMITT
BY
Spencer E. Olson
ATTORNEY Feb. 24, 1970 R. E. HILEMAN ET AL 3,497,625

DIGITAL MODULATION AND DEMODULATION IN A COMMUNICATION SYSTEM

Filed July 15, 1965 5 Sheets-Sheet 4

INVENTORS
RONALD E. HILEMAN
VINCENT C. OXLEY
JOSEPH W. SCHMITT

BY Spencer E. Olson

ATTORNEY

INVENTORS
RONALD E. HILEMAN
VINCENT C. OXLEY
JOSEPH W. SCHMITT
BY
Spencer E. Olson
ATTORNEY

United States Patent Office 3,497,625
Patented Feb. 24, 1970

3,497,625

DIGITAL MODULATION AND DEMODULATION IN A COMMUNICATION SYSTEM

Ronald E. Hileman, Clarence, and Vincent C. Oxley and Joseph W. Schmitt, Buffalo, N.Y., assignors to Sylvania Electric Products Inc., a corporation of Delaware Filed July 15, 1965, Ser. No. 472,266
Int. Cl. H04j *1/00;* H04l *3/00;* H03k *13/00*
U.S. Cl. 179—15 26 Claims

ABSTRACT OF THE DISCLOSURE

A communication system wherein the functions of modulation and demodulation are performed by digital processing. The modulator comprises a memory for storing as binary numbers the values of amplitude samples at uniformly spaced intervals of a waveform, a logic circuit for selecting sample values from the memory in accordance with a program which determines the frequency or frequencies to be synthesized and any phase shift keying information, a digital multiplier for modifying the selected sample values with frequency shift keying and amplitude modulation, a digital adder for summing the multiplied sample values to provide multiple-tone values, and a digital-to-analog converter for providing output voltage levels corresponding to the modulator processed binary numbers. The demodulator samples received analog signals, converts the samples into binary numbers, translates the binary numbers to base band by multiplication with selected vector values stored in a demodulator memory, processes the direct current signals in the digital equivalent of an integrate and dump matched filter and bandpass filter, and detects the filter output with appropriate digital operations.

This invention relates generally to binary communication systems and more particularly to apparatus for generating, transmitting and receiving and demodulating information signals.

Data communications, such as radio teletype, have heretofore been accomplished with a variety of forms of modulation, the choice depending upon the characteristics of the transmission media, the desired rate of information transmission, the bandwidth available, the degree of circuit complexity, and the tolerability of errors. In the high frequency (HF) portion of the spectrum where this type of communication is normally conducted, variations in the propagation media with time of day, time of year, and sun-spot activity, limit the rate of data transmission. For example, because multipath considerations can cause differences in the time of transmission over different signal paths by as much as two to three milliseconds, it is necessary to use long signal elements, typically of the order of seven to ten milliseconds in duration. Since a signal element length of say ten milliseconds limits the data rate to a maximum of one hundred bits per second, it is customary to use multiple, closely spaced channels to achieve a satisfactory rate of data transmission. A number of multiple parallel channel systems are in current use, employing a variety of modulation techniques to impress the information data on the channel frequency. Two widely used techniques are frequency shift keying (FSK) in which the binary signal to be communicated is applied at the input information rate to a modulator which generates two frequencies, one for "mark" and one for "space," and phase shift keying (PSK) wherein the phase of the signals in multiple channels is varied in response to the information to be transmitted. Phase shift keying systems are of a variety of forms, and include two-phase keying by which it is possible to impress one information bit per signaling period per channel, and four-phase keying by which two bits of information can be impressed on each channel.

There are arguments for using FSK under certain conditions of the transmission media and for using PSK under other conditions. For example, if the medium is stable, from a bandwidth conservation standpoint, phase shift keying is more efficient than FSK. On the other hand, instabilities in the propagation medium can introduce phase jitter, and error in the data transmission, under which conditions FSK would appear to be more desirable. Present systems, however, do not permit selection between FSK and PSK (unless, of course, one has a dual installation) because each of the known systems is designed for one type of modulation. That is, prior art systems include circuits precisely tuned to particular frequencies, and detection equipment responsive only to a change in frequency, or to a phase change, depending on the modulation technique used. The systems currently capable of detecting information carried by an FSK system are not able to demodulate the phase shift modulation of a PSK system, and vice versa. For example, one implementation of an FSK system includes a plurality of keyed filters, each of which is tuned to the frequency of the tone with which it is associated; it is an analog device designed for a specific frequency selection function and is unsuitable for a phase shift keying system. Similarly, a PSK system employs phase detectors which have no utility in an FSK system.

A common feature, and shortcoming of both FSK and PSK systems is the requirement for multiple equipment for each of the plurality of channels; that is, a modulator, a demodulator, a filter, etc., are required for each of the plural channel frequencies, a duplication of special components which makes the equipment complex, bulky and expensive. An attendant disadvantage of the multiple channel implementation is the requirement for individually tuning the detectors, modulators, etc., of each channel. This is a time-consuming effort and, indeed, it is difficult for an operator to know at any one time whether each of the elements in each of the channels is optimally tuned. A relatively recent development in tone multiplexing systems, known as the Kathryn system, overcomes the duplication of channel hardware by time-sharing one modulator between multiple channels by time compressing means. While this time compression technique, described in U.S. Pat. No. 3,168,699, has the advantage of reducing the number of circuits and components required for multichannel operation, it is not without serious limitations. The delay line and recirculating loop, which is the heart of the technique, must be very precise, and because the effective length of a solid delay line may vary with temperature, it is necessary to house it in a controlled oven. Moreover, the time compression process requires recirculation of the information signal from each channel at least twice, and typically up to fifty times, which creates the opportunity for introducing unwanted additive phase shifts, and a phase shifter in the recirculating loop must be extremely precise. The components of the recirculating loop are all analog in nature and as such not only introduce stringent requirements for accuracy, but also limit the system to the mode of operation for which i tis specifically designed.

A common goal of all of these known prior art systems is to use available bandwidth as efficiently as possible, which has necessitated use of frequencies in the multiple channels which are extremely close to each other. A commonly used technique to optimize channel utilization is to space the channels at the nulls of the sin $\chi/\chi$ spectrum of the other channels. However, with frequencies spaced this closely, a drift in the frequency of any of the channels destroys the orthogonal relationship of the frequencies and introduces unacceptable cross talk with other channels. Thus, frequency stability is extremely important in prior art multi-channel communication systems, and has been provided at the expense of costly, precision equipment.

With an awareness of the foregoing limitations and disadvantages of the prior art, applicants have as a primary object of the present invention to provide a new and improved signal processing system.

Another object of the invention is to provide a signal processing system having flexibility as to number of channels, channel spacing, signal element length, and type of modulation.

Another object of the invention is to provide a communication system providing means for adapting to variations in propagation media; i.e., capable of changing type of modulation, signal element length, or other parameters depending on the measured performance of the communication system.

Another important object of the invention is to provide a demodulator capable of demodulation and detecting signal information modulated in accordance with any of the currently known techniques, be it FSK, PSK, or known variations thereof, and as such capable of replacing the demodulator of existing systems such as Kineplex, Kathryn, etc.

Another object of the invention is to provide a multichannel communication system in which analog circuitry and components are replaced with digital circuitry to achieve improved reliability, and reduce the size and cost of the equipment.

Still another object of the invention is to provide signal processing apparatus which is readily changeable from one mode of operation to another to provide, in one system, an availability of several modulation techniques and accordingly the capability to adapt to changes in the propagation media to minimize the error rate of the system.

Another object is to provide new and improved signal processing apparatus having multi-channel capability but in which there is no requirement for tuning of equipment associated with individual channels.

A more specific object of the invention is to provide phase-pulse generating apparatus which affords a higher order of phase accuracy of its output pulses than is obtainable with prior art generators.

A corollary object is to provide apparatus for more accurately establishing the phase and amplitude conditions for a number of channels in a frequency- or time-multiplexed communication system than is possible with prior art apparatus.

Still another object of the invention is to provide new and improved signal processing apparatus of high reliability, operating at a high degree of efficiency and at least the same speed as prior art devices, while achieving equally good or superior results, while materially reducing the number and cost of components required to achieve such performance.

Another object is to provide signal processing apparatus using digital techniques for generating phase information and having components of reduced size, bulk and weight, and power consumption, and having a lower cost for manufacturing and maintaining the same, and readily susceptible to application of microminiaturization techniques and integrated circuits to further reduce its size and weight.

Still another object of the invention is to provide multichannel communication apparatus readily adaptable to such now unknown modulation techniques as may become available in the future.

Briefly, the signal processing apparatus according to the invention includes a modulator in which signal information is processed digitally instead of by analog processing means, and a demodulator at the receiver in which digital processing is also utilized for demodulating and detecting information signals received from the transmitter. The demodulator, in addition to being operative with the digital modulator to be described, is capable of deriving information signals from the transmissions from most, if not all, of the different types of multi-channel communication systems in current use. This universality is achieved by substituting for the continuous process used in prior art systems, a digital processing technique in which signals are represented by a series of sampled data values that approximate the continuous analog signals of such prior art systems. For example, a cosine wave, which is normally represented by the expression $A\cos\omega t$ is represented herein as $A\cos^{*}\omega t$, where the asterisk (*) is the conventional sampled data notation. The function $A\cos^{*}\omega t$ is defined at sample points $t_1$, $t_2$, $t_3$, etc., and when the sampling rate is equal to or greater than the Nyquist rate, the sampled representation contains the same information as the continuous cosine wave. In the implementation of the invention, the function is made to carry the same value between samples as the previous sample, instead of going to zero as is the case with classic Nyquist sampling, with the result that the function $\cos^{*}\omega t$ is of "staircase" or "boxcar" form superimposed on a cosine wave-form.

The modulator of the invention digitally calculates successive sample values, which upon appropriate reconstruction, reproduce the desired analog signal, be it a sine wave, cosine wave or other time-varying waveform. Reconstruction is accomplished by converting the samples to a direct current level by a suitable digital-to-analog converter, such as a current summing network having binary weighted inputs. The resulting stepped direct current level is then passed through a low pass filter designed to remove the higher harmonics caused by the sharp steps in the waveform whereby the output of the filter closely approximates the analog signal being simulated. The output of the filter is used to modulate a transmitter, which may be any of many types currently available.

An important advantage of using digital techniques to generate the sample values is that the modulator can, by minor changes in the program of the digital circuitry, selectable at will by the operator, generate sample values representing many different types of modulation. For example, multiple frequencies or tones, commonly used for high speed data transmission over high frequency (HF) radio links, are derived by storing in a binary memory the values of a finite number of samples for a cosine wave, and at appropriate times taking these samples from memory and applying them to a filter which converts them to the desired analog waveform. In an illustrative system to be described in detail hereinafter, using a ten millisecond bit or frame length and twelve simultaneous frequencies separated by 100 cycles per second (c.p.s.), the twelve tones are represented as a linear summation of sampled cosine waves. A 100 c.p.s. cosine wave goes through one complete cycle during the ten millisecond bit length and in this example is represented by forty-eight successive vector values. The first vector is used for the first $\frac{1}{48}$ of a frame, the second vector is used for the next $\frac{1}{48}$ of the frame, the third vector is used for the next succeeding $\frac{1}{48}$ of the frame, and so on. The forty-eight vector values are stored in a suitable memory, such as a magnetic core memory. A 200 c.p.s. cosine wave is simulated by selecting every second vector of the 100 c.p.s. cosine wave, thus going through two cycles in ten milliseconds. Similarly, a 300 c.p.s. cosine wave is obtained by using every third vector, a 400 c.p.s. cosine wave is obtained by using every fourth vector, and so on up to 1200 c.p.s. for which every twelfth, or only four of the available forty-eight vectors, are used.

Multiple tones are obtained by summing the vector values representing selected ones of the twelve different frequencies. Similar to an analog system in which the outputs of twelve oscillators having frequencies 100 c.p.s., 200 c.p.s., 300 c.p.s., etc., are linearly added, the present digital modulator performs the same addition by adding the appropriate vectors. Under control of suitable logic circuitry the appropriate vectors are selected from the memory and added in a binary adder. After the vector values representing the first sample (the first 1/48 of the frame) are added, the sum is transferred to a buffer storage register which controls the digital-to-analog converter, allowing the next set of twelve vector values (the second 1/48 of the frame) to be summed while the converter is putting out the first D.C. step in the "staircase" waveform. This summing operation continues for all forty-eight samples, and the D.C. steps are then applied to a low pass filter which passes the desired frequencies while attenuating the harmonics caused by the abrupt steps in the waveform, to produce an output waveform which closely resembles the combined output of twelve oscillators differing in frequency by 100 c.p.s.

The multiple tones are modulated in different modes by operations on the vector values as they are read from memory. For example, 180° phase shift keying is obtained by inverting the sign of the vectors as they are taken from memory. Frequency shift keying is accomplished by multiplying all of the vectors corresponding to the "off" tone by zero and multiplying the "on" tone vectors by one. Amplitude modulation is achieved by multiplying all of the vectors by the desired amplitude coefficient, and phase modulation is produced by advancing or retarding the phase program of the logic circuitry which selects the vectors from memory.

At the receiver, a digital demodulator samples the received signal and converts the samples to digital format. Thereafter, the samples are operated on to perform the digital equivalent to translation, filtering and detection. The received analog signal is sampled at the Nyquist sampling rate or higher, whereby the samples contain all the information in the received signal. The samples are converted to binary numbers by an analog-to-digital converter circuit, the conversion having enough significant bits to accurately represent the input samples. That is, each sample is represented by a sufficient number of bits to reduce the effects of roundoff errors to negligible quantities; word lengths of eight to ten binary bits has been found satisfactory.

The digital samples are then "mixed" or translated to direct current by multiplying them by the appropriate vector values stored in the demodulator memory. Similar to an analog mixer in which the received signal is multiplied by a local oscillator signal, the digital demodulator of the invention performs the same operation on a sample by sample basis with the "local oscillator" cosine waveform also represented by binary number sample values. The "local oscillator" samples are selected from the demodulator vector memory in the same way as they are selected in the modulator.

The output of the multiplier is then "filtered" by digital circuitry equivalent to a filter. While many filter functions can be realized digitally, the optimum matched filter for 10 millisecond pulses with white Gaussian noise is an integrate and dump matched filter. The integration is accomplished by an addition of samples, and the dump at the end of ten milliseconds is a simple clearing of the memory. A bandpass filter is realized digitally by the summation of samples with a subtraction of a portion of the sum to represent the losses inherent in a filter having a finite Q. The Q or bandwidth of the filter can be varied by adjusting the magnitude of the portion subtracted from the sum.

The output of the filter is then detected, using the appropriate digital operation for the type of modulation being used. For example, frequency shift keying (FSK) is detected by comparing the magnitude of the "mark" filter output with the "space" filter output and making a decision in favor of the larger. One implementation of this operation is a subtraction of the two numbers and ascertaining the sign of the difference. Differential phase shift keying (DPSK) is detected by comparing the phase of one bit with the preceding bit. In the instant demodulator, the preceding bit is stored in memory and then multiplied by the current bit, the sign of the vector dot and cross-products representing the information.

Additional operations can easily be added. For example, in-band frequency diversity can be implemented by combining the output of the redundant channels before making the final information decision. Optimum ratio combining (i.e., $x^2$ weighting) is easily accomplished since squaring is simply a binary multiplication.

Significantly, it is not necessary that the sampling rate of the demodulator be the same as in the modulator, from which it follows that there is no requirement for precise synchronization between the sampling times at modulator and demodulator. Rough synchronization of the 10 ms. bits is required to the same degree it is required in prior art analog equipment. The modulator simply uses digital techniques for generating output signals which closely simulate the signals from conventional analog devices, and the demodulator employs digital processing techniques for translating and detecting analog-type signals, whether they be modulated by the digital modulator of the present invention or by conventional analog devices. Accordingly, the demodulator can be used to receive and detect the transmissions of any of the several multi-channel communication systems in current use.

Other objects, features, and advantages of the invention will become apparent, and its construction and operation better understood, from the following detailed description taken in conjunction with the accompanying drawings, in which.

Figure 1:
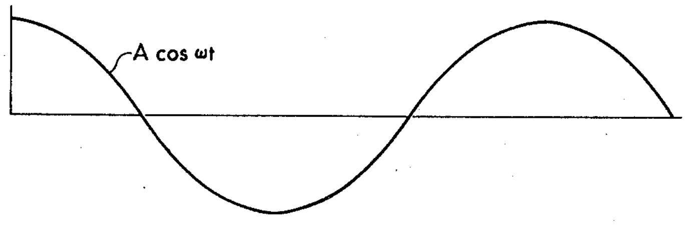
FIGS. 1, 2 and 3 are waveforms useful in describing the sampled data concept.
Figure 2:
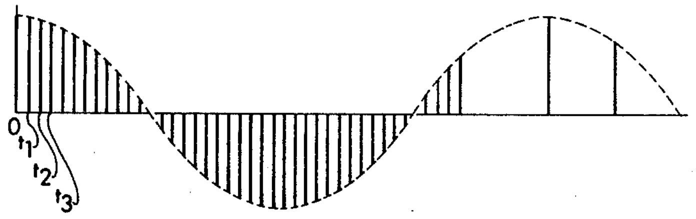
Figure 3:
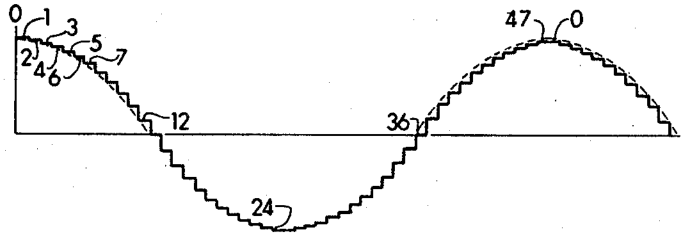

As has been generally discussed previously, the present invention provides a multi-mode communication capability by substituting digital processing for the analog circuit processing of prior art systems. Underlying the attainment of this broad object is the Nyquist sampling theorem which state, in effect, that one can completely describe a band-limited signal by samples of the signal taken at a rate at least twice the bandwidth. The original signal can be precisely reconstructed from the sample values by multiplying each sample by a sin $x/x$ function and summing all of the products. In the implementation of the present invention, the ideal sin $x/x$ weighting taught by Nyquist is not utilized completely; instead, a rectangular weighting function is used. This results in a good approximation of the sin $x/x$ function at high sampling rates and the approximation is improved by suitable filtering. In the application of the Nyquist sampling theorem to the present invention, the cosine wave of FIG. 1, $A\cos\omega t$, can be represented by a series of sample values measured at time $t_1$, $t_2$, $t_3$, etc., and is expressed as $A\cos^*\omega t$, where the asterisk (*) is the conventional sampled data notation. As represented in FIG. 2, the samples exist only at discrete points of time, the value of the function being zero between samples, carries the same value at the previous at the Nyquist rate or higher, the continuous representation of FIG. 1 and the sample representation of FIG. 2 contain the same information. The data samples of FIG. 2 are readily converted to the analog representation by passing the samples through a filter designed to pass only the information bandwidth. In some cases, as in the implementation of the present invention, it is desirable to stretch the narrow pulses indicated in FIG. 2 in order to pass more energy through the filter. As used in the present system, the sampled function, instead of going to zero between samples, carriers the same value as the previous sample. Thus, the function $\cos^*\omega t$ prior to application to the aforementioned filter resembles a "staircase" superimposed on the cosine waveform as illustrated in FIG. 3. It will be noted that the waveform of FIG. 3 has a discrete value during each of a multiplicity of finite periods, and from the foregoing discussion of the Nyquist sampling theorem, it will be evident that the waveform can be represented by a different multiplicity of finite samples than has been illustrated. The digital modulator of the present invention utilizes this fact to generate tones.

Figure 4:
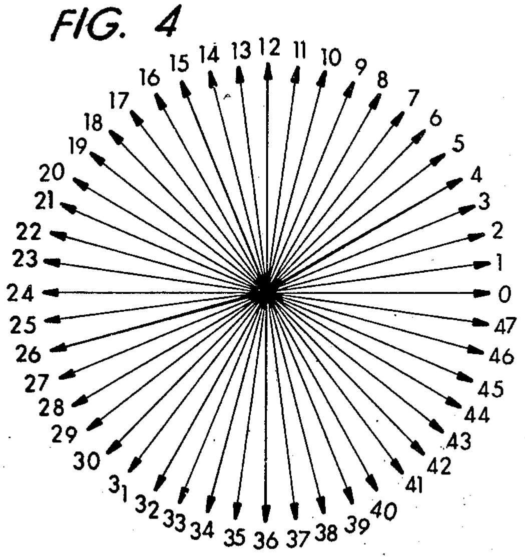
FIG. 4 is a diagram representing the values of the sample vectors in a system employing forty-eight tones per frame.

In accordance with the invention, the discrete values of the samples or "steps" of the cosine wave of FIG. 3 are stored as binary numbers in a binary memory, and at appropriate times, related to $t_1$, $t_2$, $t_3$, etc., these values are taken from the memory and applied as inputs to a low pass filter which converts the sampled data to the analog waveform for transmission to an associated receiving terminal. In the system to be described hereinafter, one complete cycle of a cosine wave at the lowest tone frequency is represented by forty-eight vector samples which may be represented as shown in FIG. 4. As shown, the stored vectors are all of unity amplitude, and each has a discrete numerical cosine value determined by the angle measured from the zero vector. The memory device, to be described more fully hereinafter, stores the numerical values of the vectors in binary form. For example, vector number six, displaced 45° from the zero vector, is stored as 0.707 in binary notation, which corresponds to the amplitude of the cosine wave at sample period number six. The availability of forty-eight sample values (which is to be understood to be by way of example only) allows the use of a selected smaller number than the total available to generate or simulate cosine waves of higher frequency than depicted in FIG. 3.

Figure 5:
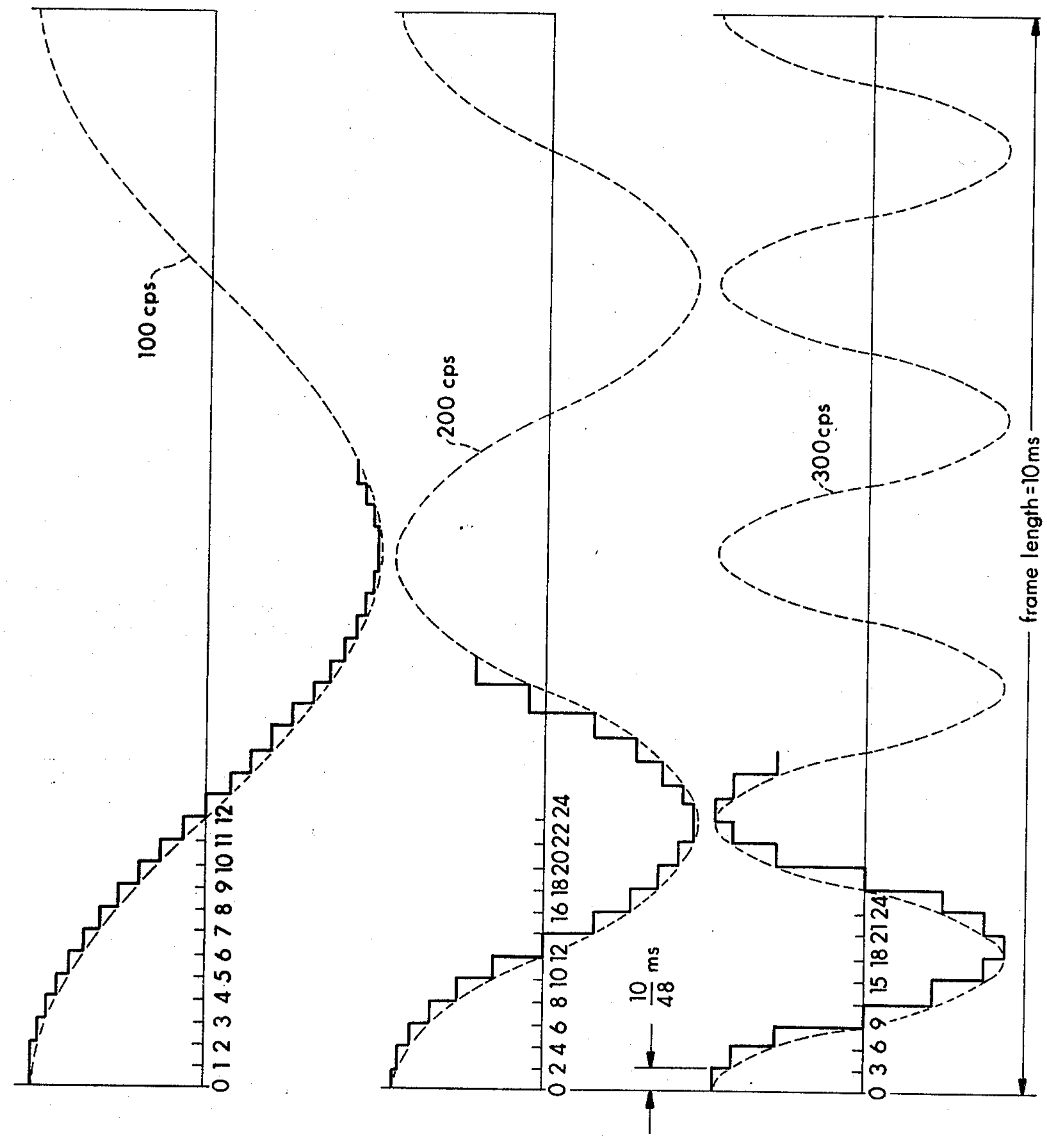
FIG. 5 is a series of waveforms illustrating how the modulator of the invention is operative to generate tones of differing frequencies.

The manner in which this is accomplished will be better seen from FIG. 5 which is a timing diagram illustrating how three tones at 100 c.p.s., 200 c.p.s. and 300 c.p.s. can all be derived from the same vector samples stored in memory. These frequencies are typical of three of the multiple tones in common use today for high speed data transmission over high frequency radio links; namely, a system employing a ten millisecond bit length and twelve simultaneous frequencies separated by 100 c.p.s. The lowest frequency tone, the 100 c.p.s. cosine wave, goes through one complete cycle in the ten millisecond frame length and can be represented by forty-eight successive vector values, sixteen of which are indicated on the upper waveform of FIG. 5. Recalling the above-mentioned departure from the Nyquist sampling technique of retaining the value of the previous sample between sample times, the first vector, $$\cos\frac{2\pi\cdot 0}{48}$$

(which has a numerical value of one) is used for the first $\frac{1}{48}$ of a frame, the second vector, $$\cos\frac{2\pi\cdot 1}{48}$$

is used for the next $\frac{1}{48}$ of the frame, and so on. The forty-eight vector values, $$\cos\frac{2\pi\cdot n}{48}$$

where $n$ is an integer from zero to forty-seven, are stored in a binary memory, such as a magnetic core memory. Thus, by sequentially taking the successive values from memory, each for a period of $\frac{1}{48}$ of the frame length, or $\frac{10}{48}$ millisecond, and passing them through a suitable filter to remove the higher harmonics caused by the "steps," the 100 c.p.s. waveform can be closely approximated.

The 200 c.p.s. cosine wave of FIG. 5, which goes through two complete cycles in a frame length, is generated by using only every second vector value stored in the memory. As in the case of the 100 c.p.s. waveform, the first vector, $$\cos\frac{2\pi\cdot 0}{48}$$

is used for the second $\frac{1}{48}$ of the frame, the fifth vector, $$\cos\frac{2\pi\cdot 2}{48}$$

is used for the second $\frac{1}{48}$ of the frame, the fifth vector, $$\cos\frac{2\pi\cdot 4}{48}$$

is used for the third $\frac{1}{48}$ of the frame, and so on. Accordingly, every other one of the forty-eight stored vector values is each used twice during the ten millisecond frame length to generate the 200 c.p.s. signal.

Likewise, the 300 c.p.s. cosine wave of FIG. 5 is generated by using every third vector value stored in the memory, each of these being used three times to generate three complete cycles during the frame length. Similarly, a 400 c.p.s. cosine wave is obtained by using every fourth vector, an 800 c.p.s. cosine wave is obtained by using every eighth vector, and a 1000 c.p.s. wave is obtained by using every tenth vector. Even when every twelfth vector value is used, for generating a 1200 c.p.s. tone, the sample rate is still four times the maximum frequency being sampled and the "staircase" waveform still represents all of the information of the corresponding cosine wave.

Multiple tones are obtained by summing the vectors in successive sample periods. Whereas in an analog system having twelve channels the outputs of twelve oscillators are linearly added, the present digital modulator performs the addition by digitally summing appropriate vectors on a sample-by-sample basis. For example, summing the three tones of FIG. 5 gives, $$v_1=\cos 0°+\cos 0°+\cos 0°$$

$$v_2=\cos\frac{2\pi.1}{48}+\cos\frac{2\pi.2}{48}+\cos\frac{2\pi.3}{48}$$

$$v_3=\cos\frac{2\pi.2}{48}+\cos\frac{2\pi.4}{48}+\cos\frac{2\pi.6}{48}$$

In this table, the first column lists the samples representing the 100 c.p.s. tone, the second column are the sample values representing the 200 c.p.s. tone, and the third column is for the 300 c.p.s. tone. $v_1$, $v_2$, and $v_3$ respectively represent the sums of the vector values of the three signals during the first, second and third sample periods It will be understood that the sample values for the other nine tones of the twelve channels can be similarly added. After the vectors representing the first sample are added, the sum is transferred to a buffer storage register which controls a digital-to-analog converter for converting the sample data representation to analog form. While the converter is putting out the first D.C. level corresponding to the sum of all of the first samples, $v_1$, the next set of twelve vectors is being summed. The output of the filter is an analog waveform indistinguishable from the output of an analog system; namely, the linear summation of the outputs of twelve oscillators of frequencies differing by 100 c.p.s.

In a similar manner the sampled data values for any number of channels can be derived. The basic equation for the vectors is:

$$v_n=\sum_{l=1}^{L} A_l\cos\left(\frac{2\pi l\cdot n}{N}+\phi_l\right)$$

where $n$ is the sample number from 0 to N−1
$l$ is the channel number from 1 to L
$A_l$ is the amplitude information coefficient
$\phi_l$ is the phase information coefficient In the example under discussion, L=12 and N=4L=48. When the argument of the $$\cos \frac{2\pi l \cdot n}{N}$$

term exceeds $2\pi$ it may be reduced by $2\pi$ since cos $(k2\pi+\phi)$ equals cos $(\phi)$ when $k$ is an integer. Thus, only N vector values need be stored in memory. The number of vectors can be further reduced by making use of the symmetrical properties of a cosine wave if N is divisible by two or four and adding external circuitry to change the sign of the vectors according to the quadrant they are in.

Figure 6:
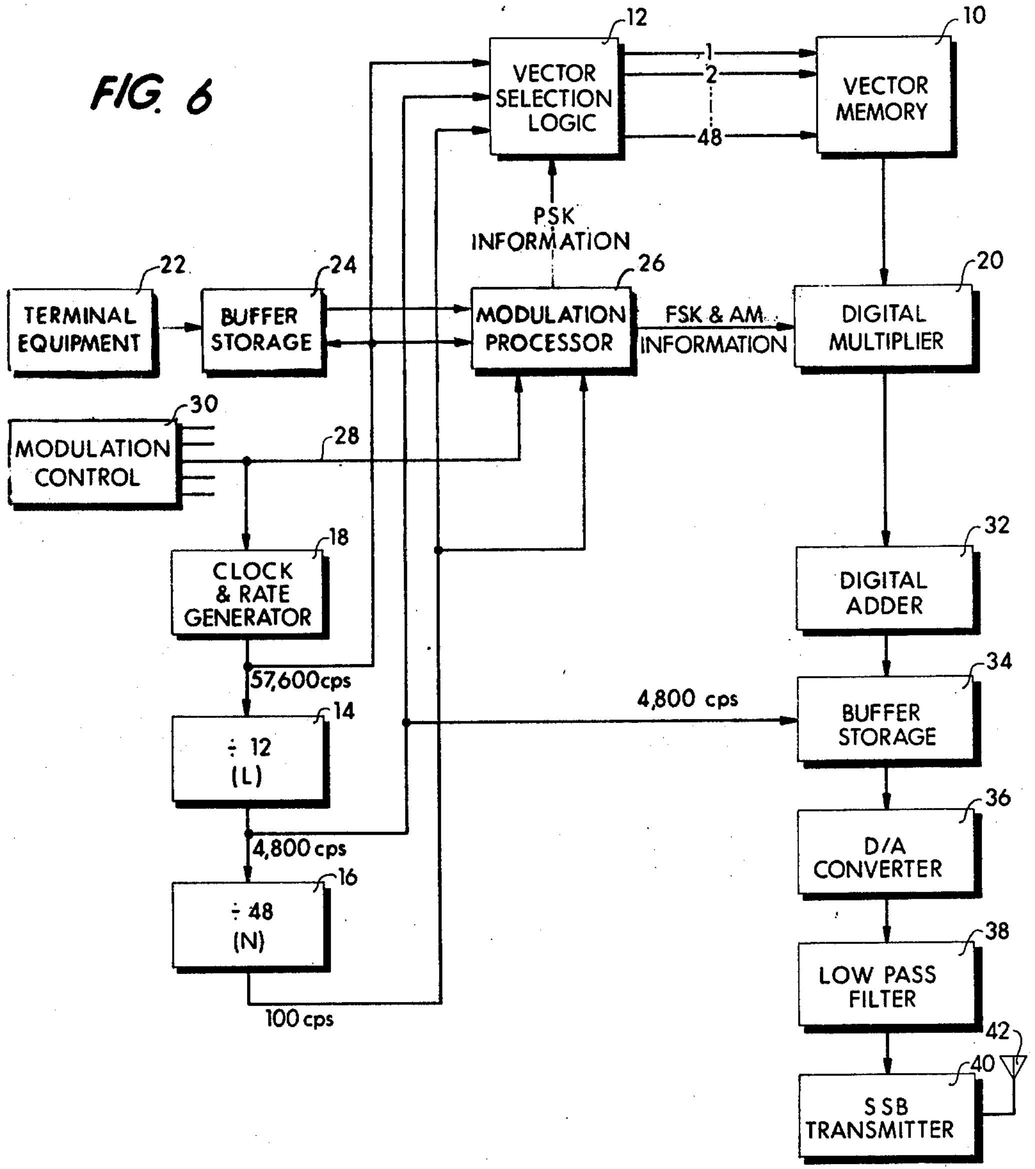
FIG. 6 is a block diagram of one form of modulator embodying the invention.

Referring now to FIG. 6 of the drawings, a preferred implementation of a modulator embodying the invention is shown in block diagram form. In essence, the modulator is a special purpose digital computer operative to calculate sample values which when reconstructed will produce a desired analog signal to be impressed as modulation on a transmitter. The N values of $$\cos \frac{2\pi l \cdot n}{N}$$

referred to in the previous paragraph are stored in vector memory 10, which may be any of many types known to the art, such as a magnetic core memory or a fixed memory such as a diode matrix. The appropriate values are read from memory under control of vector selection logic 12. The vector selection logic calculates which vector should be read out for each channel $l$ at each sample time $n$ by multiplying $l$ times $n$ and reducing the product modulo-N. By reducing modulo-N is meant that the product $ln$ has the value N subtracted from it repeatedly until the remainder is between O and N.

The values of $l$ and $n$ are respectively derived by counting down in a divide-by-12 circuit 14, and in a divide-by-48 circuit 16, the output pulse train from a system clock and rate generator 18. The clock rate determines the rate at which the samples are generated and hence controls the channel spacing. For the twelve-channel, 10 ms. frame example, the clock frequency is 57,600 c.p.s. This rate is divided by twelve to obtain the vector generation rate of 4,800 c.p.s., and the latter rate is further divided by forty-eight to obtain the frame rate of 100 c.p.s. It will be evident that the use of this technique of vector selection gives the system the capability of changing the data rate merely by changing the clock frequency. If the clock rate is doubled, the samples occur at twice the rate thereby doubling the frequency of each tone. The frame period is at the same time halved so as to maintain the orthogonal spacing between channels. Thus, the frequency spacing between tones can be varied simply by changing the clock frequency.

The vector selection is modified by any phase shift keying (PSK) information contained in the data to be transmitted. For example, a +90° phase shift is obtained by adding $N/4$ to the $ln$ product which causes selection of a vector that is advanced by ¼ of a cycle. A −90° information phase shift is obtained by subtracting $N/4$, and a 180° phase reversal is obtained by adding $N/2$. Other phase shifts, in increments of $2\pi/N$, can be obtained by adding other numbers. The vector representing each tone is modified by the information corresponding to that tone so that each tone is modulated individually.

The output of vector selection logic 12 causes the binary word representing the selected vector to be read from memory 10 into a digital multiplier 20 where the vector is modified by any amplitude information. For example, FSK modulation is obtained by multiplying the ON channel by unity and the OFF channel by zero. Pulse amplitude modulation is obtained by multiplying vectors corresponding to the desired channel by an appropriate weighting coefficient. Other forms of amplitude modulation are possible including pulse shaping. While rectangular pulses are most commonly used in digital communications, other wave shapes, such as raised-cosine pulses, are sometimes used to reduce sideband energy. Pulse shaping is accomplished in the present system by changing the amplitude weighting to the multiplier during the bit period. The number of frequencies being transmitted can be reduced by multiplying the vector corresponding to the unwanted frequencies by zero. The amplitude information is used on a tone-by-tone basis so that each tone can be individually amplitude-modulated as well as phase-modulated. Each tone can be phase- and amplitude-modulated at the same time.

The information is supplied to the modulator from terminal equipment 22, which may be one or a multiplicity of Teletype machines, a multiplexer, a voice digitalizer, a computer, or any other source of digital information. The digital information is read into a buffer storage unit 24, such as a shift register, which adjusts the voltage level and timing of the information to a form suitable for internal processing in the modulator.

The information is then transferred, under control of shift pulses from clock 18, to a modulation processing unit 26 where it is converted into the proper coefficients for modifying the vector samples. The type of modulation desired is determined by selected combinations of voltage levels applied on multiple input lines which control the modulation processing logic, one of which is shown at 28. The required voltage levels are produced by modulation control circuitry 30 and may be selectively applied to line 28 in different predetermined combinations by switches manually actuated by an operator, or by suitable automatic control equipment. Such automatic control equipment may take a variety of forms, such as a central control for a multiplicity of transmitters which is operative to change the type of modulation and/or data rate of all transmitters at specified times of the day, or upon observance of an excess error rate, or it may be a transmission performance unit operative to measure various parameters of the transmission media and to order a change when performance falls below an acceptable minimum. Should a change in data rate be indicated, the repetition frequency of clock 18 is changed in response to a command signal from modulation control 30.

Modulation processor 26 performs three functions. When necessary, it encodes the information signal, it converts phase-modulation information to binary numbers suitable for use in vector selection logic circuit 12, and it converts amplitude information to appropriate weighting factors for use is the digital multiplier 20. Encoding of the information signals is necessary for differential phase shift keying where a "mark" is represented as a change of phase between signaling elements and a "space" is represented by no change of phase. Encoding is also used for combining two information bits for use in four-phase shift keying, which transmits two information bits per frame. The encoded phase shift information is converted to a binary number, which when added to the $ln$ product in vector selection logic 12, changes the phase of the selected vector by the desired amount. Thus, information calling for a 90° phase shift causes the binary number 12, $(N)/4$, to be added to the $ln$ product before logic 12 selects the vector from memory 10.

Multiple tones are obtained by summing in a binary adder 32 the vector values representing the twelve different frequencies, as modified in the digital multiplier by the information signal. As mentioned earlier, the vector values are added on a sample-by-sample basis to derive a composite set of sample signals representative of the modulated multiple tones. That is, the vector values representing the first sample of each of the tones (which occur during the first $1/48$ of the frame) are added in binary adder 32 and the sum transferred to buffer storage 34. After the first set of samples is added and put in buffer storage, binary adder 32 sums the next set of twelve vector values (the second 1/48 of the frame) and transfers it to buffer storage 34. Under control of a 4800 c.p.s. clock signal derived from divide-by-12 circuit 14, the contents of buffer storage 34 is transferred to a digital-to-analog converter 36 which generates a D.C. voltage level of magnitude proportional to the sum of the sample values of all of the tones as contained in buffer storage in successive sample periods so as to produce, after all forty-eight samples have been added, a "staircase" signal having forty-eight discrete D.C. steps or sample values respectively representing the sum of the corresponding sample values of the twelve tones. This signal, in which the magnitude of each of the "steps" is maintained substantially constant throughout the sample period (as were the sample values of the individual tones maintained constant through the sample period as shown in FIG. 5) is then applied to a low pass filter 38 which passes the desired frequencies while attenuating the harmonics caused by the abrupt steps in the waveform. For the frequencies and sampling rates here under discussion, low pass filter 38 should have an upper cutoff frequency between 1200 and 2400 c.p.s. After "smoothing" by filter 38 the output waveform closely resembles the analog signal as would be derived from the combined output of twelve oscillators differing in frequency by 100 c.p.s. To emphasize, the characteristics of the modulating signal "calculated" by the just-described digital technique is indistinguishable from a signal produced by analog devices and containing the same information.

Figure 7:
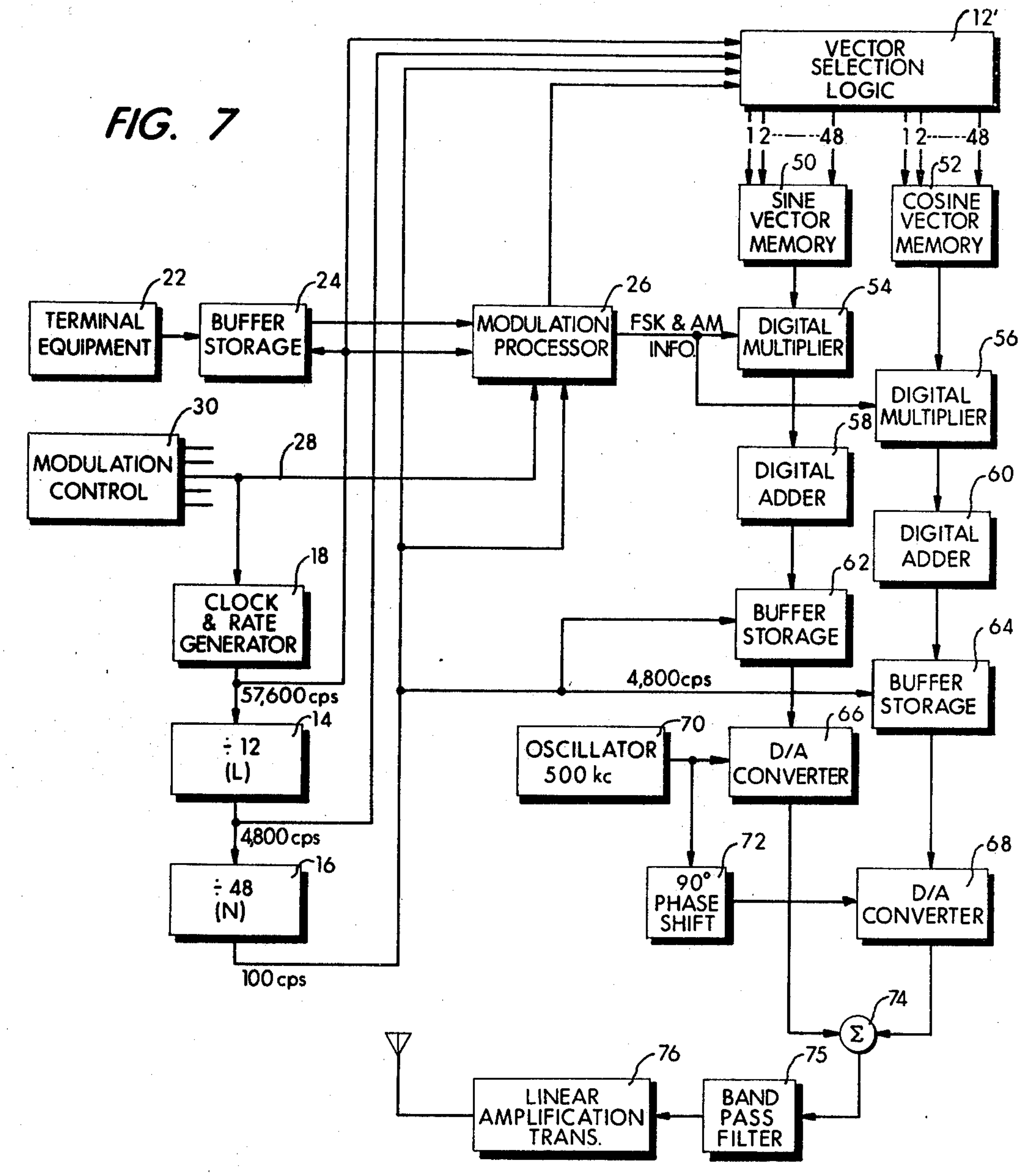
FIG. 7 is a block diagram of an alternative form of modulator embodying the invention.

The output of filter 38 is applied to a transmitter 40 which transfers it to an antenna 42 for electromagnetic-wave transmission. For the base band output just described, the transmitter is preferably of the single sideband type. Transmitters of types other than SSB can be used with the modulator by slightly modifying the modulator so as to produce an output consisting of a number of tones at some convenient intermediate frequency such as 500 kc., instead of at base band. With this modification, the output tones would be at 500 kc. plus 100 c.p.s., 200 c.p.s., 300 c.p.s., etc., respectively, which can be readily translated to the desired output frequency by standard linear amplification transmitters. FIG. 7 is a block diagram illustrating how the output stage of the modulator of FIG. 6 is modified to produce an I.F. output signal.

In FIG. 7, modulation control 30, modulator processor 26, and associated timing generators are the same in construction and operation as the corresponding circuitry in FIG. 6, and a description thereof will not be repeated here. In this case, however, each tone (of which there are twelve) is represented by an in-phase component and a quadrature-phase component with respect to the 500 kc. carrier. Thus, it is necessary to calculate two quantities to represent each sample value, and to this end, the numerical values of the sine and cosine defining each of the forty-eight vector samples depicted in FIG. 4 are respectively stored in a sine vector memory 50 and a cosine vector memory 52. Both of these memories may, of course, be physically embodied in a common memory device, and are shown as being separate only for clarity of description. These numerical values are selected from the memories by vector selection logic 12′ which has the same functional organization as the corresponding circuit in FIG. 6, under control of modulation processor 26. Vector selection logic 12′ calculates which sine and cosine vector should be read out of memories 50 and 52 for each channel $l$ at each sample time. The binary words representing the vector selected from each are respectively applied to corresponding digital multipliers 54 and 56 where the vectors are modified by any amplitude modulation from modulation processor 26 in the manner described in connection with FIG. 6. The outputs of the two multipliers are added in respective adders 58 and 60 and the sums transferred to buffer storage circuits 62 and 64, respectively. Similarly, there is a digital-to-analog converter for each of the sine and cosine components, shown at 66 and 68, respectively, to which the contents of buffer storage circuits 62 and 64 are respectively transferred under control of a 4800 c.p.s. clock signal. The 500 kc. I.F. signal referred to earlier is applied to converter 66 from a suitable oscillator 70, and the same signal shifted 90° in phase by a phase shifter 72 is fed to the other converter 68. The outputs of the two digital-to-analog converters, which are each the 500 kc. carrier, at 90° with respect to each other and each modified by the output of its respective buffer storage, are added in a resistive summing network 74. The output of adder 74 is a carrier whose amplitude is proportional to the binary numbers in the buffer storage circuits 62 and 64. The output of adder 74 is filtered in a band pass filter 75 and applied to a suitable linear amplification transmitter 76. It will be evident that this modification gives the modulator the capability of putting out frequencies below the carrier frequency as well as above it, so that while two vectors are required per sample, they are generated in parallel, and do not require an increase in computational rates, while the number of frequencies that can be generated at the given computational rate is double the capability of the FIG. 6 circuit because the base band modulator obviously cannot produce negative frequencies.

Figures 8, 9:
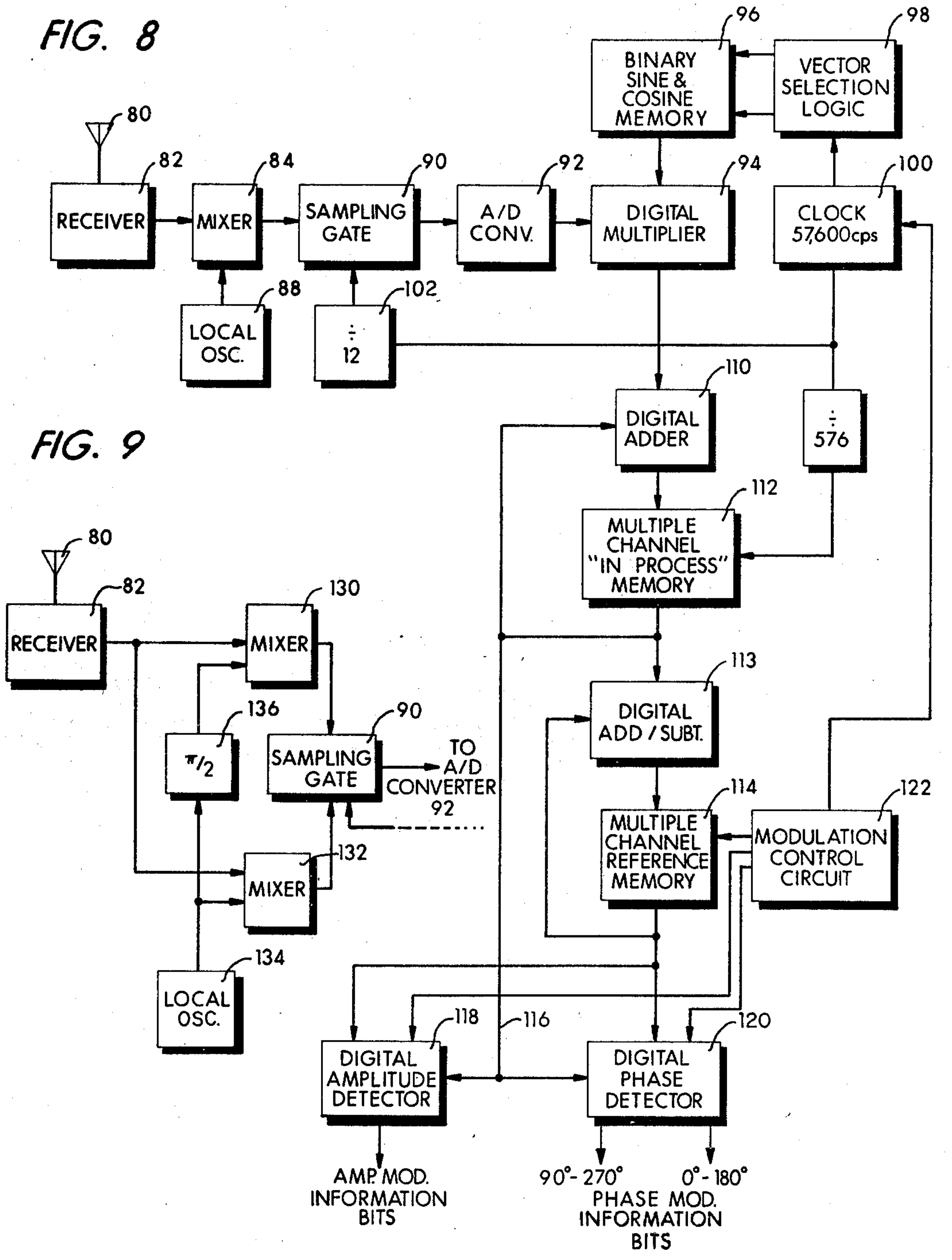
FIG. 8 is a block diagram of a digital demodulator embodying the invention.
FIG. 9 is a block diagram of an alternate form of a portion of the demodulator of FIG. 8.

FIG. 8 shows a digital demodulator system for digitally detecting a received wave of the type transmitted by the system of FIG. 6 or 7, or any signal modulated according to presently known modulation techniques. Before proceeding to a description of the system, it will be helpful to consider the nature of the demodulation problem. Whereas conventional analog demodulators extract each information-bearing tone from the complex baseband signal, and demodulate each tone in a separate demodulator, the present digital demodulator heterodynes each information channel in turn to direct current (D.C.), and then performs a digital matched filtering process to remove non-D.C. components. A digital multiplier and digital amplitude comparator are employed to respectively detect the phase and amplitude modulated information.

Re-examination of FIG. 5 will reveal that if all of the time samples in any one of the single tones are added together, the sum value will be zero. Or, stated another way, the average value of an A.C. sinusoidal (or cosinusoidal) waveform is zero. Similarly, if all the sum samples derived to synthesize the complex waveform of the modulator were added together, the result would be zero, unless a D.C. "tone" were present. Assuming for the moment that a D.C. tone is present, linearly adding all the sum samples together is an exact digital equivalent of the analog linear integrator. Since all non-D.C. tones in the orthogonal set describe a whole number of cycles during the frame period, and hence have an average value of zero if added over the full frame period, the only component (tone) contained in the digital integrator summation at the end of the frame period is the D.C. tone. Clearing the integrator at the end of the frame period will provide a function identically equivalent to the linear "integrate and dump" or keyed filter analog function which has been shown (in Pat. Nos. 2,825,808, 3,056,890 and 3,146,400, for example) to be the optimum process for separation of parallel tone channels. Thus, merely adding the received sum samples together is an optimum detection process for the D.C. term contained in the complex waveform.

Next, consider heterodyning the 100 c.p.s. channel ($l=1$) to D.C. to enable separating and integrating the 100 c.p.s. channel energy in the manner just described for the D.C. tone. This can be done by multiplying each received sum sample value by a replica of the synthesized 100 c.p.s tone generated in the modulator. This multiplication or heterodyning, which corresponds to the action in a balanced modulator, is described mathematically as $$\cos(\omega_1 t+\phi_1)[+\cos(-\omega_2 t)+j\sin(-\omega_2 t)]$$
$$=\tfrac{1}{2}\cos(\omega_1 t-\omega_2 t+\phi_1)+\tfrac{1}{2}\cos(\omega_1 t+\omega_2 t+\phi_1)$$
$$-\tfrac{1}{2}j\sin(\omega_1 t+\omega_2 t+\phi_1)+\tfrac{1}{2}j\sin(\omega_1 t-\omega_2 t+\phi_1)$$

where $\phi_1$ is an arbitrary phase shift between the received signal of frequency $\omega_1$ and the locally synthesized reference signal of frequency $\omega_2$. The sum frequencies are filtered out, by summing the samples in the manner described above for the D.C. channel, leaving only the difference frequency, which is D.C. when and only when $\omega_1=\omega_2$. All other input frequencies when heterodyned with $\omega_2$ will not produce a D.C. component and will sum to zero over the frame period. Thus, only the input channel frequency corresponding to $\omega_2$ will be demodulated. Similarly, the other tones ($l=0, 2, 3 \ldots$ etc.) are selectively demodulated by multiplying each with a local signal of the same frequency. It will be noted that the digital multiplication process is far superior to the analog process which cannot provide a pure multiplication because the diode devices utilized have a characetristic transfer function $ae+be^2+ce^3 \ldots$ the $a$, $c$ and $d$ coefficients causing intermodulation which can degrade receiver performance. Thus, by a repeated process of multiplying the received sum samples by a synthesized version of each channel tone (in quadrature components), it is possible to sequentially translate each information-bearing channel to D.C., filter it in a "perfect" (lossless) keyed integrator, and present the information to a demodulator.

Returning now to FIG. 8, the receiving terminal includes an antenna 80 connected to a receiver 82 which, if used with the system of FIG. 6, is of the single sideband type, and may include conventional heterodyning means for translating the received frequency down to a desired I.F. The I.F. signal from receiver 82 is first heterodyned to baseband in mixer 84 by a local oscillator 88 whose frequency equals the lowest frequency tone in the I.F. Rather than providing a separate channel for the further processing of each of the tones as is done in most prior art systems, the received signal is sampled and digitally processed to perform the equivalent of translation, filtering and detection. To this end, the output of mixer 84 is applied to a sampling gate 90 where it is sampled at the Nyquist sampling theorem rate or higher. The sampling rate is not necessarily the same as the rate at which samples are "calculated" in the modulator, but for engineering and manufacturing reasons they preferably are the same. The sampling gate samples the analog signal for short periods, and according to the Nyquist sampling theorem the samples contain all the information in the received signal. Sampling gate 90 may take any of several forms well known to the art, an early type of which is shown in Patent No. 2,778,933. Its function is to derive short pulses, at specified time intervals, having amplitudes corresponding to the instantaneous amplitude of the wave at the time of sampling.

The samples are converted to binary numbers by an analog-to-digital converter circuit 92 which may be any one of several types commercially available. Converters suitable for the purpose are available from Epsco, Raytheon Company and Computer Control Corporation, to name but a few. The output of converter 92 is a series of binary numbers each representing the magnitude of a corresponding sample. Each sample is represented by a binary number having a sufficient number of significant bits to accurately represent the samples; if too few bits are used in the conversion, round-off errors will introduce noise or crosstalk between channels. It has been found that these effects are negligible if eight to ten binary bits are used to represent each sample amplitude.

Analogous to conventional mixers wherein the received signal is multiplied with a local oscillator signal, the binary samples are then sequentially multiplied in a digital multiplier 94 by appropriate sine and cosine values from a vector memory 96 of the type described in connection with FIG. 7 to heterodyne the several channel signals to D.C. in the manner described above. That is, vector memory 96 also stores forty-eight vector values which when appropriately reconstructed produce a sine or cosine wave in the manner previously described. Thus, the digital multiplier 94 multiplies the received signal, in the form of digital words, on a sample by sample basis, by the "local oscillator" sine or cosine wave, which also are in the form of binary numbers. The "local oscillator" samples are selected from memory 96 by vector selection logic circuitry 98 of the same type and operative in the same way as that used in the previously described modulator. The vector selection logic is controlled by a system clock 100, which for convenience and practical engineering considerations has a repetition frequency of 57,600 c.p.s. Because the multiplication function requires synchronism between the "local oscillator" samples and the binary numbers representing the incoming signal samples, sampling gate 90 is also controlled by clock 100, at a sampling rate of 4800 c.p.s. This rate is achieved by dividing the pulse rate of the master clock 100 by a divide-by-12 circuit 102.

The multiplier 94 mixes the received signal with the "local oscillator" signal by multiplying each of the forty-eight successive sample values from A/D converter 92 by the appropriate sin $\theta$ and cos $\theta$ values $$\left(\theta=\frac{2\pi ln}{N}\right)$$

from memory 96 immediately after receipt and storing the product in the cells of a multiple channel "in process" memory 112 allocated to that channel. Upon receipt of the next sum sample, a new series of multiplications takes place, and the previously stored channel information is recalled from memory 112 and added, in binary adder 110, to the new product, and then placed in the channel memory cells. The high speed capability of known digital multipliers permits one multiplier to be time-shared between all twelve channels in the instant system, and more should a larger number of channels be desired. Thus, the converter output is multiplied in turn by the twelve values selected from memory that represent the "local oscillator" vectors for that particular sample tone. At the end of the frame (after the $n=47$ sample has been processed) the contents of memory 112 contain the quadrature components of the twelve received signal elements or tones. These quadrature components are then presented to the demodulator circuits for recovery of the transmitted information and memory 112 is cleared to make it ready for summing the next frame. This clearing of the "in process" memory, under control of clock 100, corresponds to the "dumping" of the analog "integrate and dump" filter referred to earlier. To handle differential modulation, where information is encoded as the change in phase or amplitude from one signalling element to the next, it is necessary to store each signalling element for one frame period to enable its use as a reference for comparison; multiple channel reference memory 114 is provided for this purpose.

Some circuit simplification is possible by the alternate implementation of the signal input portion of the system of FIG. 8 shown in FIG. 9. In this modification the received I.F. signal from receiver 82 is mixed in two mixers 130 and 132 with a signal from a local oscillator 134 having a frequency centered in the I.F. band. The local oscillator signal to mixer 130 is phase-shifted by 90°, in phase-shifter 136, relative to the signal applied to mixer 132, whereby the outputs of the two mixers have a quadrature relationship. Since the local oscillator is in the center of the I.F. band, the difference frequencies will contain both positive and negative frequency components, which in the example here under discussion would be in the range from −600 to +600 c.p.s. The phase relationship of the quadrature mixer outputs determine the direction of vector rotation and hence whether the "frequency" is positive or negative. Since the highest frequency component is 600 c.p.s. rather than the 1200 c.p.s. in the system of FIG. 8, it is possible to halve the Nyquist sampling rate per mixer. The total number of samples per second remains the same, however, since two channels are being sampled instead of one. The analog-to-digital converter 92 performs the same function as in the system of FIG. 8, and multiplier 94 performs the process.

$$[\cos(\omega_1 t+\phi_1)+j\sin(\omega_1 t+\phi_1)]\cdot[\cos(-\omega_2 t)+j\sin(-\omega_2 t)]$$

to detect each tone. It is necessary to store only half as many vectors in memory 96 (i.e., twenty-four when compared to the system of FIG. 8) since the highest frequency is 600 c.p.s. instead of 1200 c.p.s. Otherwise the system is the same as shown in FIG. 8.

Returning now to FIG. 8, it will be recalled that at the end of the frame the contents of memory 112 is presented to demodulator circuitry for recovery of the transmitted information. Depending on the type of modulation employed, it may be necessary to detect amplitude or phase information, or both, and to this end, the output of memory 112 is applied, via connection 116 (consisting of a multiplicity of wires), to a digital amplitude detector 118 and a digital phase detector 120. The "filtered" signal is represented by two quadrature components in memory 112, and the information is carried in the phase or amplitude of the resultant vector of these components. The detection process for PSK, FSK, ASK and other known types of keying will now be described.

Demodulation of phase shift keying (PSK) is performed by comparing the phase of two successive vectors, which may be represented in polar coordinates as $R_1e^{j\phi_1}$ and $R_2e^{j\phi_2}$. The phase $\phi_2$ is first inverted and the vectors are then multiplied together to give $R_1R_2e^{j(\phi_1-\phi_2)}$. The phase information is contained in the exponent $(\phi_1-\phi_2)$ and ideally would be 0°, 90°, 180° or 270° for 4-phase shift keying. Noise, of course, changes the phase somewhat from the ideal and imposes the requirement that the demodulator make a decision in favor of the nearest one of these. Thus, if $\phi_1-\phi_2$ should be between +45° and −45°, the demodulator decides that a 0° phase was sent, etc. It is to be noted that the herein disclosed digital demodulator employs rectangular coordinates rather than polar coordinates and performs the multiplication $R_1e^{j\phi}\cdot R_2^{-j\phi_2}$ by performing $$(x_1+iy_1)(-x_2-iy_2)=(y_1y_2-x_1x_2)-j(x_1y_2+x_2y_1)$$

The resulting quadrature components describe the phase difference of the two original vectors. If both components are positive, the difference lies between 0° and 90°; if both are negative, the difference is between 180° and 270°, etc. A decision that the phase is between +45° and −45° requires that the in-phase component be positive (i.e., $(y_1y_2-x_1x_2)$ is greater than zero) and that it be of greater magnitude than the quadrature component $(x_1y_2+x_2y_1)$. If the in-phase component is negative and of a magnitude greater than the quadrature component, then the phase difference is 180°±45°. Similarly, the phase difference is 90°±45° if $$(x_1y_2+x_2y_1)>(y_1y_2-x_1x_2)$$

and the former term is greater than zero, and is 270°±45° if $(x_1y_2+x_2y_1)>(y_1y_2-x_1x_2)$ and the former term is less than zero. Phase detector 120 comprises a logic circuit operative to determine which component is larger (by subtracting one component from the other and examining the sign of the difference) and also to determine the direction of the components. An alternate, and somewhat simpler, implementation of phase detector 120 is to phase-shift one of the original vectors by 45° so that a 0°±45° phase shift changes to 45°±45°=0° to 90°. The detection process then consists only of examination of the signs of the quadrature components and does not require the subtraction step described above.

For detection of differentially coherent two-phase modulation, detector 120 makes a 0° shift decision if the received vector lies between 0°±90° and a 180° decision for $\phi_1-\phi_2=180°\pm90°$. If the in-phase component of the difference vector is positive a 0° decision is made and a 180° decision is made if the in-phase component is negative. The quadrature component is not used.

Demodulation of frequency shift keying (FSK) is accomplished by comparing the magnitudes of the two frequency channels that represent the "mark" and "space" signals. The "mark" and "space" vectors being represented in memory 112 in rectangular coordinates have to be converted to magnitudes by taking the square root of the sum of the squares of the two components. The "mark" magnitude is then subtracted from the "space" magnitude and the sign of the difference represents the information, a negative difference representing "mark" and a positive difference representing "space." Alternatively, the square root operation can be omitted to save computation steps since the sign of the difference of the squares of the magnitudes also represents the information.

Amplitude shift keying (ASK) can be detected by comparing the magnitudes of a signal element against a derived threshold. The threshold is set halfway between the different keying levels based on the preceding signal element or elements. For example, when transmitting three bits per signaling element, two bits are carried as differential four phase modulation and the third bit is carried as two level amplitude shift keying. The amplitudes used to carry the third bit are unity for "mark" and one-half for "space." The threshold is set half-way between these two amplitudes, at three-fourths. The threshold is implemented digitally by multiplying the magnitude of the previous signaling element by ¾ if the previous decision was a "mark" and multiplying by 1.5 if it was a "space." The threshold value is then subtracted from the current signal magnitude and a "mark" decision is made if the difference is positive and a "space" decision is made if the difference is nagative. The threshold setting for the next signal element is then generated by multiplying the current signal magnitude by ¾ or 1.5 depending on the information decision just made and the result is then stored in memory until the next signal is integrated.

ON-OFF keying is detected by comparison against a threshold which is the average of several preceding bits. The average is determined by summing the magnitude of N successive bits and then dividing by N. If N is large enough for the average number of ON's to equal the average number of OFF's, the threshold will be at half the ON level. The information decision is again based on the sign of the difference between the magnitude of the signal vector and the threshold. The threshold can be updated regularly to follow changes in signal strength caused by fading.

A number of more recent modems have used transmitted references or pilot tones for phase keyed systems. One of these transmits the information on the in-phase components of a four phase system and transmits a phase reference on the quadrature components. The receiver detects these components separately, filters the pilot tones and uses the filtered pilot as a quasi-coherent reference for the information detection. The present digital implementation filters the pilot by summing the successive bits in memory. The circuit operation is as follows: The contents of memory 114 are transferred to a digital adder/subtractor circuit 113 where the current vector from memory 112 is added thereto. The sum is then reduced by subtracting a fixed fraction of the sum from itself and the remainder is then transferred back to memoyr 114. This results in an exponential buildup and decay of the filtered pilot vector and is the equivalent of the loss and bandwidth of a single tuned filter. The time constant or bandwidth of the pilot channel filter is determined by the frac tion of the aforementioned sum that is subtracted.

Another type of modulation that is sometimes used is a transmitted reference system which sends a CW tone and information modulated tones on either side of the CW reference. The reference is filtered separately and used as a quasi-coherent reference for the phase shift information on the other channels. The present digital implementation filters the reference in the same manner that the quadrature pilot tone described previously was filtered. The filtered reference is then phase shifted digitally to compensate for frequency difference between the reference and information tones and finally used as a reference for the demodulation multiplications; i.e., the dot and cross products that are used to recover the information.

A type of modulation designed to combat severe multipath distortion is described in the article entitled "A Communication Technique for Multipath Channels" by Robert Price and Paul E. Green, Jr., published in the Proceedings of the Institute of Radio Engineers, March 1958. In order to achieve its results, the information bits in this system, known as Rake, are encoded into a pattern of short phase-reversed bits, and the receiver includes a number of mixers which correlate the received signal with a locally generated replica of "mark" and "space" patterns. Each mixer is synchronized slightly differently so that it correlates with a different multipath delay. The separate outputs from the plural mixers are coherently combined and provide a signal having a high order time diversity on severely distorted multipath signals. This performance is achieved, however, at the expense of complex circuitry including a delay line with a plurality of taps and a like number of respective tap circuits. The digital demodulator of FIG. 8 is also capable of detecting the Rake type of modulation, and from the foregoing discussion it is evident that it does so without many of the hardware limitations of the Rake receiver. The delay line is effectively replaced by a binary memory, eliminating the inherent attenuation, bandwidth reduction and distortion of a delay line, and the function of the multiple mixers is accomplished by the single digital multiplier 94, which eliminates signal cross-talk problems. In the present digital system, all of the "mixers" have the same gain (unity) and the same phase shift (none) so no balancing of channels is required before combining outputs. The ratio squared "optimum" combining of outputs taught by Price and Green is easily accomplished digitally by suitable programming of the system of FIG. 8.

The demodulator is set or readied to demodulate any one of the above-described types of modulation by a modulation control circuit 122 arranged to accept inputs manually inserted by an operator or automatically inserted by control circuitry forming a part of an adaptive communication link. Control circuit 122 consists essentially of a multiplicity of gates arranged to select the appropriate outputs from amplitude detector 118 and phase detector 120 for the type of modulation being received. For example, to receive FSK, the outputs of phase detector 120 are gated off, and the inputs to amplitude detector 118 are connected to the appropriate "mark" and "space" channels in memory 112. Reference memory 114 is not needed in FSK operation and is, in effect, disconnected by control circuit 122 when this type of modulation is being received. To detect differential amplitude shift keying, the previous signal vector is stored in reference memory 114 and control circuit 122 is manipulated to connect one input of detector 118 to "in process" memory 112 and the other input to the corresponding channel in reference memory 114.

Control circuit 122 is operative to gate the outputs of amplitude detector 118 off when phase shift keying is to be detected. To detect two-phase DPSK, control circuit 122 utilizes the sign of the in-phase (0°−180°) component of the output of phase detector 120, and to detect 4-phase DPSK it combines the signs of both the in-phase and quadrature components to obtain the information.

When a signal from a modulation system utilizing a transmitted reference is to be received, control circuit 122 is set so as to be operative to modify the operation of reference memory 114 so that it averages (filters) the transmitted reference. The modulation control circuit has the further capability of selecting the outputs of both the amplitude and phase detector circuits at the same time to demodulate signals such as two level AM with DPSK. Control circuit 122 is also connected to the system clock 100 and is operative to adjust the clock rate to change the tone frequencies and bit rates as required for different modulation and data rates.

Control circuit 122 serves the additional function of varying the length of the transmitted frame. As is known, cross-talk between channels is suppressed in multichannel systems by the use of frequencies which are orthogonal over the integration time of the integrate and dump function. Due to the time spread of the received signal, however, it is desirable to provide a time guard band—a time slot in which a tone is transmitted but not detected in the receiver. Thus, the tones for a transmitted frame needn't be and often are not orthogonal since the receiver is timed to look at only a portion of the received signal over which the tones are orthogonal. In certain modes of operation (e.g., FSK) which do not employ the dump function, orthogonality even in the receiver is unnecessary.

From the foregoing it is evident that applicants have provided signal data processing apparatus wherein analog processes normally used to generate, modulate, filter and demodulate parallel data channels are replaced by digital synthesis and analysis processes. It is a sampled data system equal or superior in performance to heretofore known data modems, but having superior reliability, stability, size and cost advantages common to digital equipments. The only adjustments available in the modem are the 90° phase shifter 72 in the modulator of FIG. 7, the 90° phase shifter in the demodulator, D/A converter 33 A/D converter 92, and the phase detector 120; all other components are digital, and while functions are readily changed by programming, no adjustments are required. Thus, the system is extremely flexible and versatile, and can be easily arranged to permit changing type of modulation, data rates, and bandwidths, on external command.

What is claimed is:

1. In a communication system, the combination comprising, a source of binary information signals, means for selecting one of a multiplicity of different types of modulation, and digital computer means coupled to said source and said modulation selecting means and operative in response to said information signals and said selected type of modulation to synthesize the sampled data equivalent of the analog signalling waveform for said selected type of modulation.

2. In signal processing apparatus, the combination comprising, a source of binary information signals to be processed, memory means storing in binary notation sample values representative of the information contained in a predetermined analog signal, and digital circuit means operative periodically to derive selected sample values from said memory means and to combine said selected sample values with said binary information to synthesize the sampled data equivalent of the signalling waveform for a selected type of modulation.

3. For a multichannel communication system, a modulator comprising in combination, a memory device digitally storing the numerical values of a trigonometric value of angles spaced at predetermined equal intervals, means operative periodically to derive from said memory device selected numerical values representative of an alternating signal of predetermined frequency, a source of digital information signals, digital multiplier means operative to digitally multiply said information signals with digital signals corresponding to said selected numerical values, and means operative to convert the output of said digital multiplier to an analog signal.

4. Signal processing apparatus comprising, in combination, a memory device storing as binary words numerical values corresponding to the amplitudes of a multiplicity of sample values representing the information contained in a predetermined cyclic analog signal, logic circuit means operative to select from said memory device binary words corresponding to selected sample values, a source of digital information signals, a digital multiplier receiving digital information signals from said source and digital words from said memory device and operative to deliver a digital output signal proportional to the product of said information signals and said digital words, and digital-to-analog converter means connected to said multiplier and operative to convert said digital output signal to an analog signal.

5. Signal processing apparatus comprising, in combination, a memory device storing as binary words data corresponding to the amplitudes of a sufficient multiplicity of sample values to represent the information contained in a plurality of cyclic analog signals, logic circuit means operative successively to select from said memory device groups of binary words corresponding to sample values representing information contained in different ones of said cyclic analog signals, a source of digital information signals, a digital multiplier operative to multiply information signals received from said source with binary words from said memory device and to deliver a digital output signal, and digital-to-analog converter means connected to said multiplier and operative to convert said digital output signal to an analog signal.

6. A modulator for a multichannel digital communication system comprising, in combination, storage means storing as binary words sample values representing the information contained in a plurality of alternating current signals having frequencies orthogonally related to the bit length of the binary information signal to be transmitted, logic circuit means operative successively to select from said storage means groups of binary words corresponding to sample values representing information contained in different ones of said alternating current signals, a source of digital information signals having a predetermined bit length, a digital multiplier operative to multiply information signals received from said source with binary words from said storage means and to deliver a binary output signal corresponding to their product, digital-to-analog converter means connected to said multiplier and operative to convert said digital output signal to a signal consisting of a connected series of stepped voltage levels, and a filter connected to said converter and operative to smooth said stepped signal to produce an analog output signal.

7. A modulator for a multi-channel digital communication system comprising, in combination, storage means storing as binary words sample values representing the information contained in a plurality of alternating current signals, equal in number to the number of channels, modulation control means for selecting one of a multiplicity of different types of modulation, logic circuit means operative in response to said modulation control means to select from said storage means, during successive sample time periods within said bit length, groups of binary words corresponding to sample values representing information contained in different ones of said alternating current signals, a source of digital information signals including a modulation processor, a digital multiplier operative to multiply information signals received from said modulation processor with binary words from said storage means and to deliver a binary output signal corresponding to their product, binary adder connected to said multiplier and operative to sum, during each of said sample time periods, the sample contribution of each of said alternating current signals, digital-to-analog converter means connected to said adder and operative to convert the digital output therefrom to a complex digitized waveform, and a filter connected to said converter and operative to smooth said digitized waveform to produce an analog output signal.

8. In signal processing apparatus, a demodulator comprising, in combination, means for sampling a received signal at a predetermined rate to produce a series of sample values, means to convert said sample values to a first series of binary numbers, representing the amplitudes of said sample values, memory means storing as binary numbers sample values representative of the information contained in a predetermined cyclic signal, digital multiplier means operative to digitally multiply said first series of binary numbers with selected binary numbers derived from said memory means, and means connected to said multiplier means operative to detect information carried by said received signal.

9. In signal processing apparatus, a source of information signals, signal sampling means receiving signals from said source and operative to produce the sampled data equivalent of said information signals, analog-to-digital converter means for producing a first series of binary numbers representative of the amplitudes of said sampled data, memory means storing as binary numbers sample values representative of the information contained in a predetermined cyclic signal, digital multiplier means operative to digitally multiply said first series of binary numbers with selected binary numbers derived from said memory means, and signal processing means connected to said multiplier means including a detector operative to deliver an output signal representative of the intelligence carried by said information signals.

10. Signal processing apparatus comprising, in combination, a source of information signals, a sampling gate receiving signals from said source and operative to sample said signals at a predetermined rate to produce a first series of sample values, analog-to-digital converter means for producing a first series of binary words representative of the amplitudes of said sample values, a memory device storing as binary words numerical values corresponding to the amplitudes of a multiplicity of sample values representative of information contained in a predetermined cyclic analog signal, logic circuit means operative to derive from said memory device selected binary words corresponding to selected sample values, and digital multiplier means operative to digitally multiply said first series of binary words with said selected binary words from said memory device.

11. Apparatus according to claim 10 wherein said logic circuit means is operative successively to derive from said memory device groups of binary words, the binary words of said successive groups representing information contained in different cyclic analog signals of orthogonally related frequencies.

12. The apparatus of claim 11 further including signal processing means connected to said multiplier means and including a detector operative to deliver an output signal representative of the intelligence carried by said information signals.

13. The apparatus of claim 12 wherein said signal processing means further includes a memory means connected to said multiplier means and operative to selectively store the products of said first series of binary words and the binary words of said successive groups.

14. The apparatus of claim 13 wherein said detector is connected to said memory means and includes means for detecting phase and/or amplitude.

15. A demodulator for a multichannel digital communication system comprising, in combination, means for receiving binary information signals having a predetermined bit length, a sampling gate operative to sample said received signals at a predetermined rate to produce a first series of sample values, analog-to-digital converter means for producing a first series of binary words representative of the amplitudes of said sample values, a memory device storing as binary words sample values representing the information contained in a plurality of alternating current signals orthogonally related to the bit length of said information signals, logic circuit means operative successively to select from said memory device, in synchronism with said sampling gate, groups of binary words corresponding to sample values representing information contained in different ones of said alternating current signals, a digital multiplier operative to multiply said first series of binary words with successive groups of binary words derived from said memory device and to deliver a binary output signal corresponding to their products, memory means coupled to said multiplier and operative to separately store said products, and signal processing means connected to said memory means and including a detector operative to deliver an output signal representative of the intelligence carried by said information signals.

16. The apparatus of claim 15 wherein said signal processing means includes second memory means, digital add/subtract means connected between the memory means storing said products and said second memory means, a digital amplitude detector, a digital phase detector, means coupling the memory means storing said products and said second memory means to both said amplitude and phase detectors, and a modulation control circuit coupled to said second memory means and to said amplitude and phase detectors and operative to condition said signal processing means to selectively demodulate one of a multiplicity of different types of modulation and to deliver an output signal from said amplitude detector, or said phase detector, or both, depending on the type of modulation, representative of the intelligence carried by said information signals.

17. A demodulator for a multichannel digital communication system adapted to demodulate the intelligence carried by binary information signals of predetermined bit length modulated in accordance with one of a multiplicity of different types of modulation, said demodulator comprising, in combination, means for receiving multichannel binary information signals having a predetermined bit length, sampling means operative to sample said received signals at a predetermined rate equal to or higher than the Nyquist sampling rate to produce a first series of sample values, analog-to-digital converter means operative to produce a first series of binary words representative of the amplitudes of said sample values, a first memory device storing as binary words sample values representing the information contained in a plurality of tone signals orthogonally related to the bit length of said binary information signals, logic circuit means operative in synchronism with said sampling means to successively select from said first memory device groups of binary words corresponding to sample values representing information contained in different ones of said tone signals, a digital multiplier operative to multiply said first series of binary words with successive groups of binary words derived from said first memory device and to deliver binary output signals corresponding to their products, means including a digital adder and a second memory device coupled to said digital multiplier and operative to separately store and sum said products, means including a third memory device and a digital add/subtract circuit couple to said second memory device, a digital amplitude detector, a digital phase detector, means operative in synchronism with said sampling means and said logic circuit means to sequentially apply the contents of said second memory device to said amplitude and phase detectors, and a modulation control circuit coupled to said amplitude and phase detectors and to said third memory device and operative to condition said detectors and to selectively apply the contents of said third memory device to said detectors to selectively demodulate one of a multiplicity of different types of modulation and to deliver an output signal from said amplitude detector, or said phase detector, or both, depending on the type of modulation, representative of the intelligence carried by said information signals.

18. The apparatus of claim 17 wherein said sampling means, said logic circuit means and said second memory device are synchronously operated by clock means producing pulses at a predetermined rate related to the bit length of said binary information signals, the number of channels and the frequencies of said tone signals.

19. The apparatus of claim 18 wherein said modulation control circuit is connected to said clock means and operative selectively to change the rate thereof, thereby to accommodate said demodulator to different data rates.

20. The apparatus of claim 17 wherein said first memory means stores as binary words numerical sine and cosine values representing the information contained in said plurality of tone signals.

21. The apparatus of claim 20 wherein said digital multiplier is operative to multiply, on a sample-by-sample basis, said first series of binary words representing a received signal of given frequency with binary words derived from said first memory device representing sine and cosine values of a tone signal having a frequency equal to said given frequency, to thereby heterodyne said received signal of given frequency to direct current.

22. Signal processing apparatus comprising, in combination, means for generating a series of binary words corresponding to the numeral values of the amplitudes of a multiplicity of sample values representing the information contained in a predetermined cyclic analog signal, a source of digital information signals, a digital multiplier receiving digital information signals from said source and digital words from said generating means and operative to deliver a digital output signal proportional to the product of said information signals and said digital words, and digital-to-analog converter means connected to said multiplier and operative to convert said digital output signal to an analog signal.

23. Signal processing apparatus comprising, in combination, means for generating successively groups of binary words corresponding to the amplitudes of a multiplicity of sample values representing the information contained in plurality of cyclic analog signals, the binary words of said successive groups corresponding to sample values representing information contained in different ones of said cyclic analog signals, a source of digital information signals, a digital multiplier operative to multiply information signals received from said source with binary words from said generating means and to deliver a digital output signal, and digital-to-analog converter means connected to said multiplier and operative to convert said digital output signal to an analog signal.

24. Signal processing apparatus comprising, in combination, a source of information signals, means for sampling the information signals from said source at a predetermined rate to produce a series of sample values, analog-to-digital converter means for producing a series of binary numbers representative of the amplitudes of said sample values, summation means including a digital adder and a memory means operative to store and sum applied signals, circuit means coupling the output of said analog-to-digital converter means to the input of said summation means, a digital detector, and means operative in synchronism with said sampling means to sequentially apply the contents of said memory means to said detector.

25. In signal processing apparatus, a demodulator comprising, in combination, means for sampling a received signal at a predetermined rate to produce a series of samples values, means to convert said sample values to a first series of binary numbers representative of the amplitudes of said sample values, memory means storing as binary numbers sample values representative of the information contained in a predetermined cyclic signal, digital multiplier means operative to digitally multiply said first series of binary numbers with selected binary numbers derived from said memory means, digital summation means coupled to said multiplier means and operative to sum the products of said first series of binary words and the binary numbers from said memory means for a selected period of time, and a detector connected to said summation means and operative to deliver an output signal representative of the intelligence carried by said received signal.

26. In signal processing apparatus, a demodulator comprising, in combination, means for sampling a received signal at a predetermined rate to produce a series of sample values, means to convert said sample values to a first series of binary numbers representative of the amplitudes of said sample values, first memory means storing as binary numbers sample values representative of the information contained in a predetermined cyclic signal, digital multiplier means operative to digitally multiply said first series of binary numbers with slected binary numbers derived from said first memory means and to deliver binary output signals corresponding to their products, means including a digital adder and a second memory means coupled to said digital multiplier means and operative to store and sum said products, a digital detector, and means operative in synchronism with said sampling means to sequentially apply the contents of said second memory means to said detector.

References Cited

UNITED STATES PATENTS

| | | | |
|---|---|---|---|
| 2,836,356 | 5/1958 | Forrest et al. | 340—347 |
| 2,865,564 | 12/1958 | Kaiser et al. | 340—347 |
| 3,030,614 | 4/1962 | Lehan et al. | 340—347 |
| 3,068,461 | 12/1962 | Gordon | 340—347 |
| 3,071,739 | 1/1963 | Runyon | 235—154 |
| 3,102,258 | 8/1963 | Curry | 340—347 |
| 3,112,478 | 11/1963 | Ostroff | 340—347 |
| 3,183,502 | 5/1965 | Marez | 340—347 |
| 3,254,337 | 5/1966 | Hunt | 340—347 |
| 3,257,657 | 6/1966 | French | 340—347 |
| 3,012,240 | 12/1961 | Klahn | 340—347 |
| 3,341,776 | 9/1967 | Doelz et al. | 325—30 |
| 3,037,190 | 5/1962 | Herbst | 332—9 X |
| 3,146,343 | 8/1964 | Young. | |
| 3,414,818 | 12/1968 | Reidel | 340—347 X |

MAYNARD R. WILBUR, Primary Examiner

M. K. WOLENSKY, Assistant Examiner

U.S. Cl. X.R.

332—22; 430—347

UNITED STATES PATENT OFFICE
CERTIFICATE OF CORRECTION

Patent No. 3,497,625 Dated February 24, 1970

Inventor(s) Ronald E. Hileman, Vincent C. Oxley & Joseph W. Schmitt

It is certified that error appears in the above-identified patent and that said Letters Patent are hereby corrected as shown below:

Column 6, line 68, the portion reading ", carries the same value at the previous" should read --. As noted earlier, if the samples are taken--. Column 7, line 4, the word "carriers" should read --carries--. Column 8, line 8, the entire line reading "is used for the second 1/48 of the frame, the fifth vector," should read --is used for the first 1/48 of a frame, but the third vector,--. Column 10, line 51, the word "is" should read --in--. Column 16, line 43, "nagative" should read --negative--. Column 16, line 73, "memoyr" should read --memory--. Column 22, line 45, before the word "plurality" insert --a--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents

FORM PO-1050 (10-69)

USCOMM-DC 60376-P69
★ U.S. GOVERNMENT PRINTING OFFICE : 1969 O—366-334